United States Patent [19]
Yeh

[11] Patent Number: 5,076,359
[45] Date of Patent: Dec. 31, 1991

[54] METHOD FOR GRAVEL PACKING WELLS

[75] Inventor: Charles S. Yeh, Plano, Tex.

[73] Assignee: Mobil Oil Corporation, Fairfax, Va.

[21] Appl. No.: 574,022

[22] Filed: Aug. 29, 1990

[51] Int. Cl.⁵ ............................................. E21B 43/04
[52] U.S. Cl. .................................. 166/278; 252/8.551
[58] Field of Search ............... 166/276, 278, 280, 297; 252/8.551

[56] References Cited
U.S. PATENT DOCUMENTS 3,378,073  4/1968  Savins.
4,574,887  3/1986  Abdo .................................... 166/275
4,595,513  6/1986  Morgenthaler et al. ........ 166/278 X
4,627,926 12/1986  Peiffer et al. .................... 166/308 X
4,842,057  6/1989  Lubitz ................................. 166/51
4,979,565 12/1990  Jennings, Jr. ...................... 166/278

Primary Examiner—George A. Suchfield
Attorney, Agent, or Firm—Alexander J. McKillop; Charles J. Speciale; Charles A. Malone

[57] ABSTRACT

A method for gravel packing perforations against homogeneous or heterogeneous reservoir formations utilizing a shear-thickening or dilatant fluid as the carrier medium of gravel. Use of this fluid provides for rheological behavior which improves both transporting and packing efficiencies/uniformities.

4 Claims, 1 Drawing Sheet

METHOD FOR GRAVEL PACKING WELLS

FIELD OF THE INVENTION

This invention relates to a sand control method for completing wells in poorly consolidated or unconsolidated formations.

BACKGROUND OF THE INVENTION

In completing wells in poorly consolidated or unconsolidated formations, consideration must be given to sand problems likely to arise during the operation of the well. The incompetent nature of this type of formation requires that the well completion technique include means for excluding sand production. Erosion and plugging effects of sand entrained in produced fluids are well known and if not arrested can seriously reduce well productivity.

The propensity of a formation to produce sand is particularly acute in formations characterized as unconsolidated or poorly consolidated. These terms, as applied to subterranean sedimentary deposits, define a particular class of sedimentary rock, the distinguishing characteristic of which is the absence of a rock matrix made up of sand grains bound into a cohesive mass.

Analytical model studies have indicated that unconsolidated rock can also be distinguished on the basis of mechanical behavior when subjected to loading. The injection of a viscous fluid into an unconsolidated body at high pressures causes the body to deform in a plastic-like manner. Field tests have shown that when subjected to fracturing pressures, subterranean unconsolidated formations deform in a plastic manner. In each of the wells treated the volumes of sand injected were considerably higher than that normally used in fracturing a consolidated formation. Moreover, the injection pressure for plastically deforming an unconsolidated formation was frequently higher than that normally required to fracture a consolidated formation.

A widely used sand control technique is the gravel pack installation which operates on the principle of forming a sand exclusion zone in surrounding relation to the wellbore. The sand exclusion zone composed of particularly graded aggregate screens out or bridges the formation sand entrained in the produced fluids. The typical gravel pack completion involves the placement of aggregate in the immediate vicinity of the wellbore and the provision of a support means for maintaining the aggregate in place. The aggregate is generally a specially graded sand or gravel, but can be other particulate material such as walnut shells, glass beads, and the like.

The placement of the aggregate immediately adjacent to the producing formation presents a major source of trouble in performing the gravel pack installation. Packing gravel into perforations is usually achieved by squeeze packing. Squeeze gravel packing is a two-stage process which includes (1) transportation of gravel slurry down through the pipe; and (2) gravel pack buildup at the formation face as fluid leaks off through the formation. In gravel packing of heterogeneous pays, frequently those perforations penetrating lower permeability formation are at best partially packed. This poor packing is caused by non-uniform leak-off rates through the heterogeneous formation. For a Newtonian carrier medium, Darcy's law states that the rate is directly proportional to the permeability. Carrier media used previously include low viscosity brine or fresh water, high viscosity oil, surfactant-base viscoelastic fluid, and shear-thinning fluid, e.g., hydroxyethylcellulose and xanthan gum solutions (HEC and XC solutions). Breakers were also added to degrade the fluid viscosity and enhance leak-off. However, the breaker has no improvement on gravel packing heterogeneous pays.

Therefore, what is needed is a carrier medium of fluid which has a different rheological behavior from those previously used so as to improve both transporting and packing efficiencies/uniformities.

SUMMARY OF THE INVENTION

This invention is directed to a method for gravel packing a perforated well which penetrates a formation or reservoir. In the practice of this invention a solution containing a shear-thickening composition is placed into a solution so as to form a mixture having a viscosity sufficient to suspend a gravel packing sand therein for a time sufficient to gravel pack a well. Thereafter, the mixture is injected into a well during a gravel pack operation. When the mixture is injected into the well the shear forces upon the mixture cause it to thicken. Upon thickening in viscosity, the mixture provides for facilitated transportation of said gravel packing sand into perforations of the well which keeps the sand from separating from the mixture. Additionally, as the shear forces on the mixture diminish once the mixture is in the gravel pack, this reduction in shear forces causes a reduction in the viscosity of said mixture. This reduction in viscosity now allows the sand to separate from the mixture and move uniformly into the perforations which causes a more uniform packing of the perforation.

It is therefore an object of this invention to provide for a fluid which will thicken upon shear forces being applied to said solution so as to hold a gravel pack sand in suspension during a gravel pack operation.

It is another object of this invention to provide for a carrier fluid which will shear thicken during the transportation of a gravel pack sand into the formation and later revert to a carrier fluid of a thinner viscosity once the shear forces have been removed from said fluid source to allow for a better fluid leak-off and more uniform packing of the perforation.

It is yet another object of this invention to provide for a more efficient and uniform manner of packing perforations within a wellbore so as to minimize downtime and repacking operations.

PREFERRED EMBODIMENT

This invention is directed to a method and composition for effectively transporting and uniformly gravel packing perforations within a wellbore which communicates with a productive zone of a formation. Methods for gravel packing a well are known to those skilled in the art. One such method is a squeeze packing method. A method for squeeze packing a wellbore is discussed in U.S. Pat. No. 4,842,057. This patent is hereby incorporated by reference herein.

In order to obtain an effective gravel pack of perforations contained in the wellbore, it is necessary that the packing sand be transported to the perforations with the sand dispensed uniformly therein. For effective gravel packing, the sand which is transported in the carrier liquid should remain dispersed in the carrier liquid until it reaches the perforations to be packed. Upon reaching the perforations, the sand should uniformly pack within the perforation and the liquid should leak-off into the formation easily.

Figure 1:
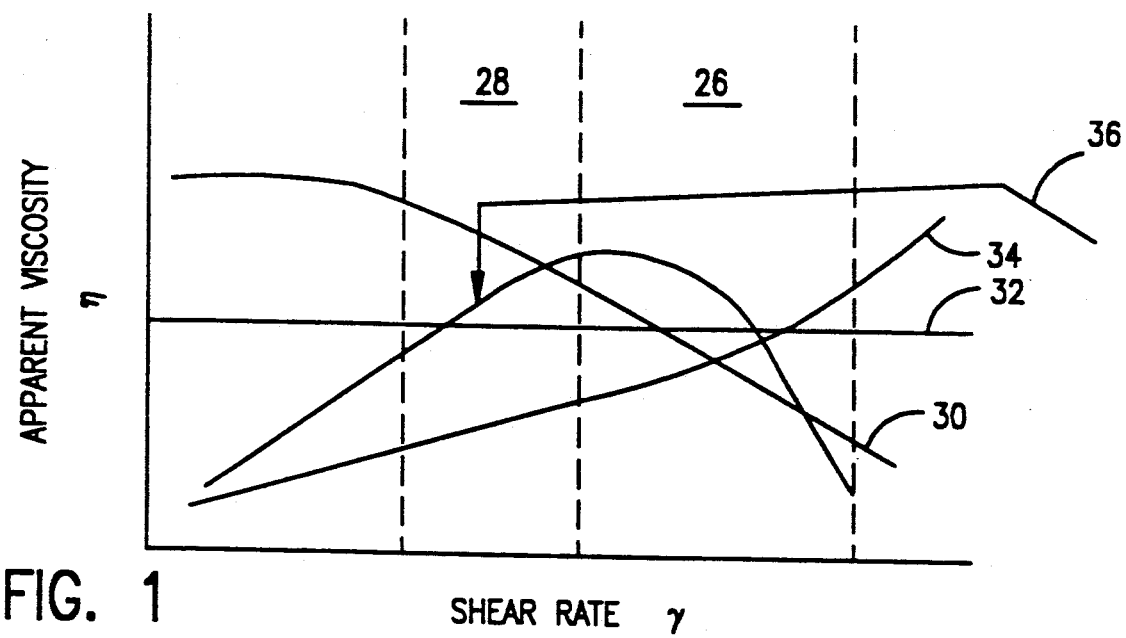
FIG. 1 is a graph which illustrates the rheology of various carrier fluids utilized in gravel packing a well.

As is shown in FIG. 1, a Newtonian liquid has a viscosity which remains unchanged when the slurry is transported or injected into the wellbore as well as when the perforation is packed by sand. Also as shown in FIG. 1, a shear thinning fluid allows for readily transporting a sand-containing slurry into an annulus of the wellbore. However, the viscosity of the shear thinning liquid is increased to the extent that it does not readily allow for the liquid to leak-off into the formation at a low shear rate once the sand is deposited into the perforations.

As is shown in FIG. 1, the shear-thickening fluid of the present invention allows for easy transportation of sand in the slurry while avoiding separation of the sand. This occurs because the shear-thickening fluid has an increase in viscosity caused by the shear forces acting upon the fluid while the slurry is being transported into the annulus of the wellbore. Once within the annulus and upon reaching the perforations, shear forces acting upon the shear-thickening fluid lessen. As the shear forces acting upon the shear-thickening fluid lessen, its viscosity decreases. This decrease in viscosity allows the sand in the carrier fluid to uniformly separate therefrom. Since the apparent viscosity of the shear-thickening fluid has decreased, in addition to allowing the sand to easily separate, it also allows the fluid of reduced viscosity to leak-off into the lower permeability formation more readily. This facilitated leak-off thus allows for the uniform sand packing of perforations within heterogeneous pays.

Referring to FIG. 1, as shear-thinning fluid 30 proceeds through slurry transportation zone 26 its apparent viscosity remains low, which facilitates the transportation. The flat velocity profile during slurry transportation can also suspend gravel very well. However, the viscosity of shear-thinning fluid continues to increase as it flows through gravel pack and formation sand zone 28 which retards the fluid leakoff and consequently the gravel pack buildup. In addition, the shear-thinning behaviour is adverse to gravel pack uniformity when gravel packing against heterogeneous formation zones.

Newtonian fluid 32 has an apparent viscosity which remains unchanged regardless of the shear rate. Sand therefore falls out of this fluid in the event of low apparent viscosity. If the apparent viscosity is high, the leak-off rate will be low and also the slurry transportation will be more difficult. In either case, the gravel pack is non-uniform when gravel packing against heterogeneous pay zones.

Shear-thickening fluid 34 without sand suspended therein increases in apparent viscosity as the shear rate is high in slurry transportation zone 26. The steeper velocity profile of shear-thickening fluid therefore provides an excellent environment for suspending gravel. On the other hand, the increased apparent viscosity at extremely high shear rate, e.g., flow through a crossover tool, may add difficulty during transportation. Upon reaching gravel pack and formation sand zone 28, a decrease in viscosity occurs which allows fluid to leak off easily into formation sand, especially those less permeable zones.

The novel shear-thickening fluid with gravel packing sand suspended therein 36 changes the viscosity characteristics of a shear-thickening fluid in high shear rate zone 26. Its apparent viscosity decreases in high shear rate zone 26 thereby improving sand transportation performance, e.g., through crossover tools. Under high shear rate, the shear-thinning behavior maintains its good gravel sand suspension capabilities and transportability of sand into the perforations. Once the high shear forces diminish as the sand/fluid mixture enters the perforations, the fluid becomes reduced in viscosity which allows the sand to separate from the fluid and uniformally pack the perforations. The fluid of reduced viscosity leaks-off into the lower permeability formation more easily.

One example of a shear-thickening liquid which can be utilized herein is discussed in U.S. Pat. No. 3,378,073 which issued to Savins on Apr. 16, 1968. This shear-thickening fluid consisted of a polyvinyl alcohol which was thickened by a cross-linking amount of borate ions. Abdo discloses a shear-thinning fluid in U.S. Pat. No. 4,574,887. This patent issued on Mar. 11, 1986. Abdo discloses a xanthan polysaccharide which is cross-linked with trivalent metal ions so as to complex the polysaccharide prior to adding a saline solution. Both patents are hereby incorporated by reference herein.

Figure 2:
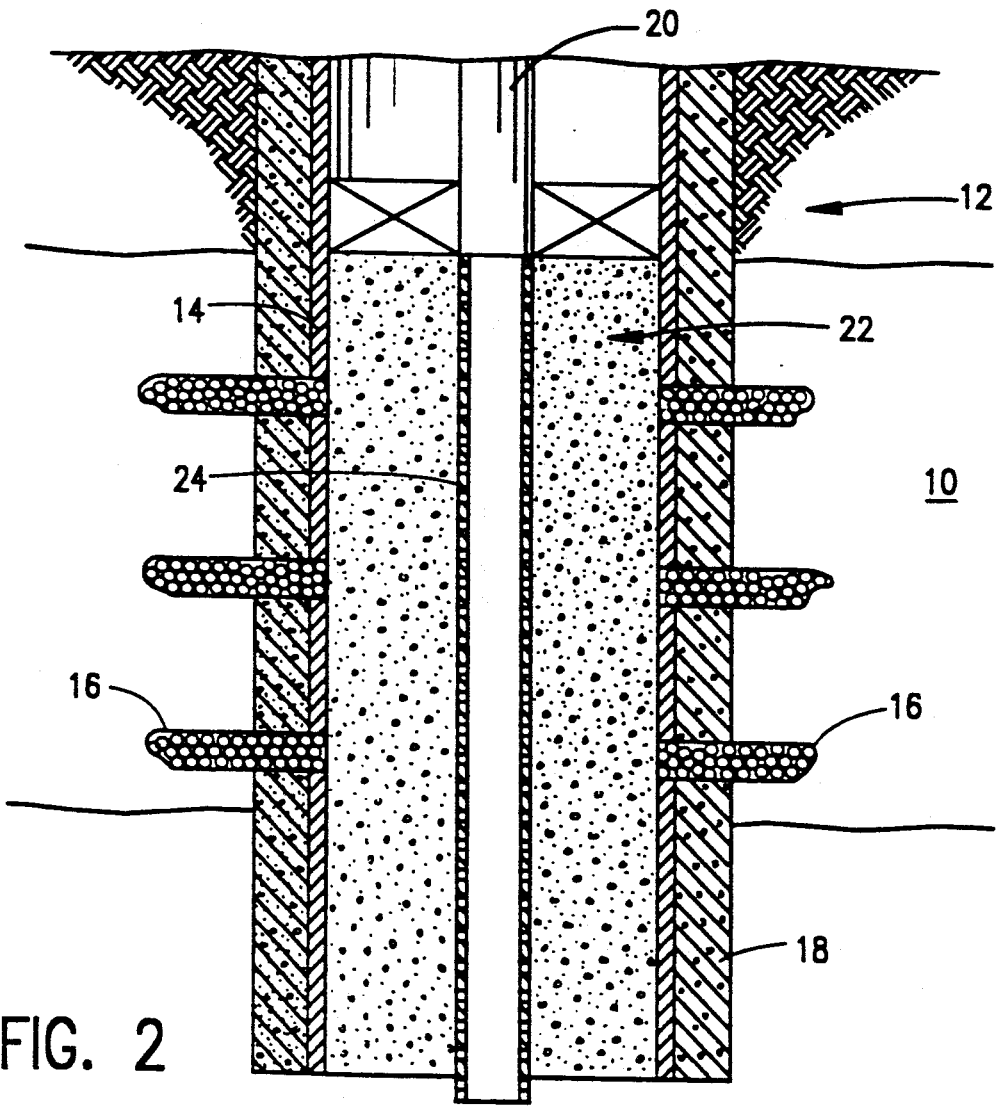
FIG. 2 is a schematic drawing of a wellbore wherein slurry is directed into perforations during a gravel pack operation.

In the practice of this invention, referring to FIG. 2, slurry is injected into wellbore 12 which penetrates sand-bearing formation 10. Fluid containing gravel pack sand enters wellbore 12 via tubing 20 and flows into wellbore annulus 22. Annulus 22 is formed by casing 14 and slotted screen 24. Perforations 16 penetrate casing 14 and cement 18 surrounding wellbore 12 and communicate with formation 10. As slurry containing the sand in the shear-thickening fluid enters the annulus 22, it carries gravel pack sand into perforations 16. Upon entering perforations 16 the viscosity of the shear-thickening fluid lessens which allows gravel pack sand to separate evenly from the fluid. Shear thickening forces previously exerted upon the slurry when injected into annulus 22 are now removed. Once the shear-thickening forces have been removed from the fluid, its viscosity decreases. This decreased viscosity allows the fluid to separate uniformly from the sand and readily enter formation 10 from perforations 16. Thus, the perforations are uniformly packed with sand as the fluid leaks-off into formation 10. After all the perforations have been packed to the extent desired, injection pressure is removed from the slurry and the gravel packing operation ceased.

A retrievable gravel packer and retrieving tool which can be used in the practice of this invention is discussed in U.S. Pat. No. 4,842,057 which issued to Lubiz on June 27, 1989. This patent is hereby incorporated by reference herein. Gravel packing sand which can be utilized herein will generally have a U.S. sieve size of from about 6 to about 70.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for gravel packing a perforated well which penetrates a formation or reservoir comprising:
   a) placing into a solution a shear-thickening composition in an amount sufficient to form a carrier fluid having a viscosity sufficient to suspend gravel packing sand therein for a time sufficient to pack said well;
   b) adding gravel packing sand into the fluid thereby suspending the sand therein;
   c) injecting the carrier fluid and sand mixture into said well under conditions sufficient to cause said mixture to shear thicken so as to provide for transportation of said sand to perforations in the well without separating from said mixture; and
   d) directing the mixture into said perforations which diminishes shear forces acting on the mixture thereby causing a reduction in viscosity of the carrier fluid, sand separation from the fluid, improved fluid leak-off into the formation, and uniform gravel packing of the perforations.

2. The method as recited in claim 1 where the formation contains heterogeneous zones.

3. The method as recited in claim 1 where gravel packing is accomplished by squeeze packing.

4. The method as recited in claim 1 where the gravel packing sand is of a U.S. sieve size of about 6 to about 70.

* * * * *